Sept. 17, 1963  H. F. BISHOP ET AL  3,103,721
WELDING PROCESS AND MATERIAL
Filed July 19, 1962  2 Sheets-Sheet 1
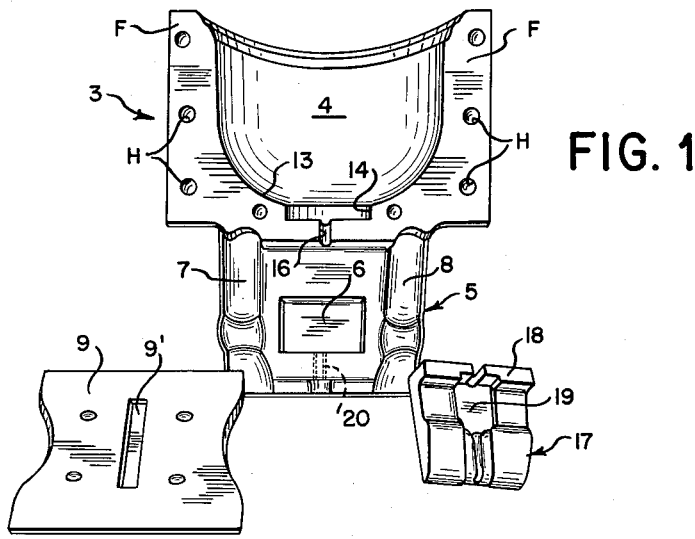
FIG. 1
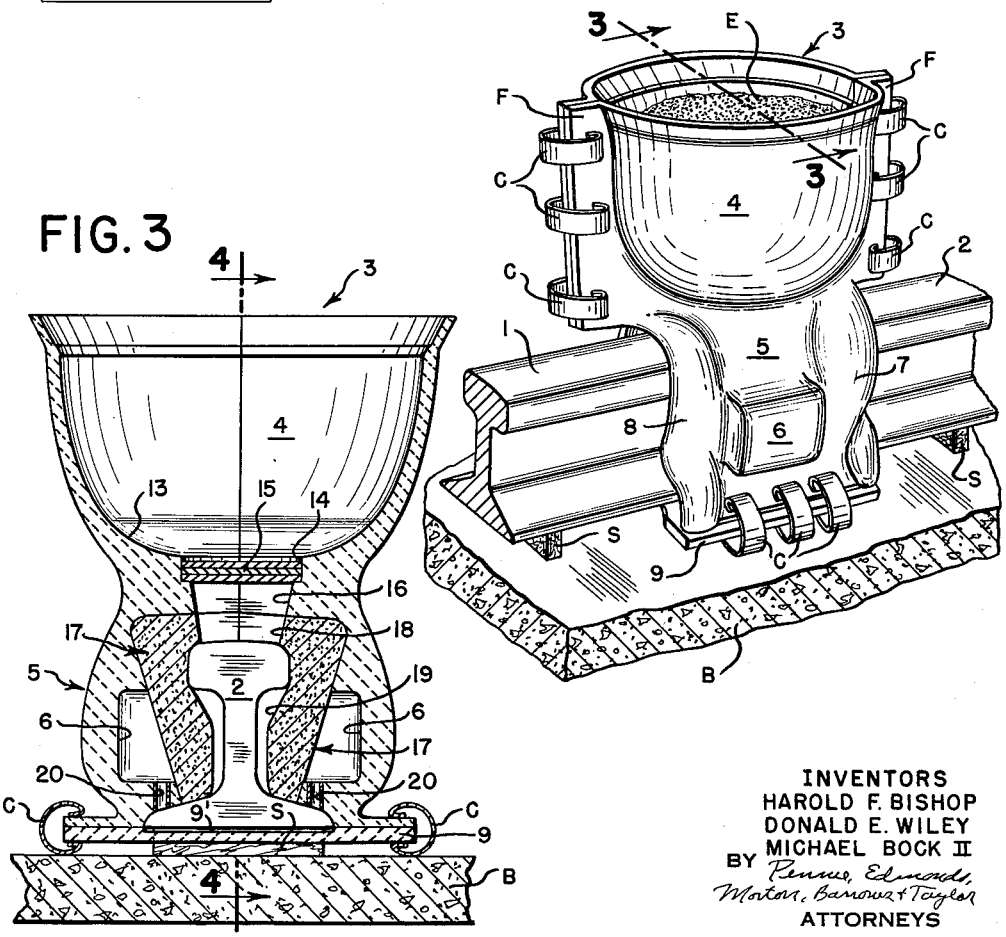
FIG. 2
FIG. 3
INVENTORS
HAROLD F. BISHOP
DONALD E. WILEY
MICHAEL BOCK II
BY *Pennie, Edmonds,
Morton, Barrows & Taylor*
ATTORNEYS Sept. 17, 1963  H. F. BISHOP ET AL  3,103,721
WELDING PROCESS AND MATERIAL
Filed July 19, 1962  2 Sheets-Sheet 2

INVENTORS
HAROLD F. BISHOP
DONALD E. WILEY
MICHAEL BOCK II
BY
ATTORNEYS

United States Patent Office 3,103,721
Patented Sept. 17, 1963

3,103,721
WELDING PROCESS AND MATERIAL
Harold F. Bishop, Donald E. Wiley, and Michael Bock II, Conneaut, Ohio, assignors to Exomet Incorporated, Conneaut, Ohio, a corporation of Ohio
Filed July 19, 1962, Ser. No. 211,071
7 Claims. (Cl. 22—116)

This invention relates to welding long and heavy structural metal members, such as bars of various shapes and steel rails, especially steel members that require preheating before welding and annealing after welding, and has for its object the provision of an improved process for preheating, welding, and annealing the welded steel members. In accordance with the invention exothermic materials are ignited in a sequence of preheating and welding, followed by retarded cooling to anneal the weld.

The invention provides a molded refractory structure or device for applying to the members to be welded a formed body of exothermic material for preheating the members near the weld, and a receptacle for another exothermic material of high heat capacity which is a metal-producing exothermic material to form the weld (hereinafter for convenience called "metal-producing material" or "metal-producing exothermic material"). The molded structure is preferably formed of at least two parts, preferably of mating halves, formed of molded refractory material, and includes a bottom or base also formed of molded refractory material. The molded refractory half-parts have attached or applied thereto molded bodies of a moldable exothermic refractory material (hereinafter for convenience called "preheating material" or "preheating exothermic material") which preheats the members to be welded without melting and remains as a rigid structure. After the preheating material has completed its reaction, the metal-producing material for forming the weld is ignited in the receptacle and the resulting molten metal which forms from the reaction runs between the members to form the weld. The objects to be welded are held apart to provide a gap for receiving the welding metal. The rigid structure which resulted from the preheating forms a barrier on each side of the weld which prevents a loss of the metal from the weld.

The molded refractory structure is preferably formed of a hard and rigid material, such as baked sand and resin mixtures as are used in the shell-mold practice. The parts of the mold, when connected together over the members to be welded form eight cavities one at the area of the weld closed at least in part by the preheating material and the refractory mold, one at each side of the weld for receiving excess or overflow metal, a receptacle above the weld for the metal-producing material for the weld, and four side pockets for packing sand.

When the parts, for example, two halves, are joined together they form a small passageway connecting the receptacle and the weld area for the flow of the molten metal into the weld area. A metal closure for this passageway is used to permit an accumulation of molten metal in the receptacle and the separation of metal and slag. When a sufficient mass of metal has accumulated the heat melts the metal closure, preferably one or more metal discs of the same composition as the molten metal, and the hot accumulated metal flows rapidly into the weld area.

An important feature of the invention is the provision of a metal receiving or overflow basin in the refractory members at each side of the weld so that more metal can flow through the gap than is necessary for the weld and the overflow can accumulate in the basins. This provides a washing action which cleans the cut surfaces of the rail ends, provides a hotter metal, and elevates the surface temperature at the weld. The accumulated hot metal at the sides of the weld are heat reservoirs which serve as supplements in retarding the cooling and in relieving stress.

In carrying out a welding operation of the invention the two half parts, each having a body of rigid preheating material, are connected together over the ends of the members to be welded together, for example steel rails, and this secures the parts of rigid preheating material on opposite sides of each rail end. The connected parts of the mold form and enclose the receptacle for the metal-producing material. The preheating exothermic material is preferably pre-molded and is inserted into the spaces in the two refractory half parts. When the two half parts are in position and secured together the preheating material is ignited as with a torch and the reaction is relatively slow liberating only enough heat to preheat the rail ends at each side of the gap but without melting the refractory structure of this material. The disc closure is then placed over the passageway and the metal-producing material is put into the receptacle. The metal closure in the bottom of the receptacle performs an important function in keeping the granular metal-producing material out of the gap. A suitable time after igniting the preheating material, say about twelve minutes, the metal-producing material in the receptacle is ignited to form the metal of the weld at a high temperature. The closure disc is of such thickness that it does not melt until there is such an accumulation of molten metal in the receptacle that the slag and metal separate. When the disc melts the accumulated clean metal flows rapidly into and through the gap and the excess metal flows upward into the basins at each side of the preheating exothermic material, the amount of metal being much more than sufficient to fill the gap and make a good weld.

The refractory mold, the reaction products and residues of the two exothermic materials and the overflow metal constitute a heat reservoir which cools slowly and anneals the weld and relieves stress.

These and other novel features of the invention will be better understood with reference to the drawings in which FIG. 1 is a perspective of one of the mold halves, one molded body of preheating material and the refractory base;

FIG. 2 is a perspective showing both mold halves and the base in position over rails to be welded;

FIG. 3 is a sectional view at 3—3 of FIG. 2;

Figure 4:
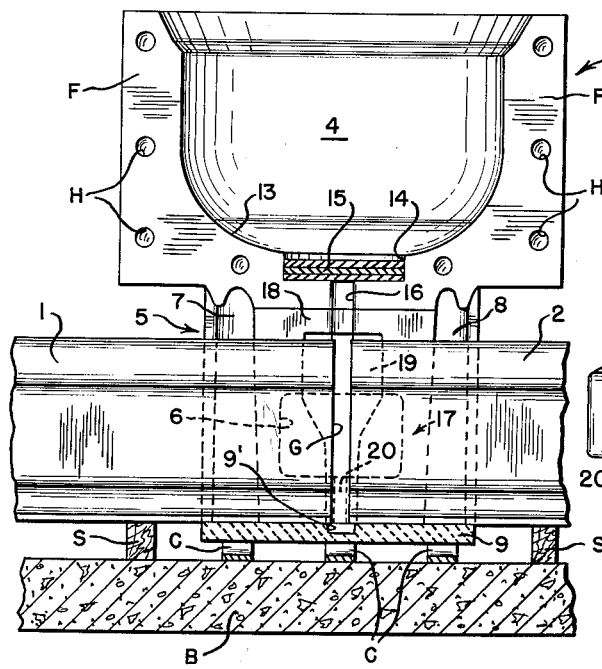
FIG. 4 is a sectional view of the mold at 4—4 of FIG. 3.

For convenience, the invention will be described with reference to the welding of rails, it being understood that the invention is applicable to the welding of other members such as girders, bars and rods. The rails 1 and 2 are spaced apart to form the gap G and are supported on thin spacing strips S on a rigid concrete base B. The mold halves 3 are identical and only one will be described in detail. Each mold half is formed of any suitable rigid refractory and is preferably molded and baked. It is advantageous to form the molds by the shell-mold technique from a mixture of sand and a resin, preferably a thermosetting phenol-formaldehyde resin. The molds may be made of other ceramic material such as sand cores, carbon dioxide-hardened sodium silicate cores, and other types of molding material usually used in foundry practice. The molds are, of course, shaped to fit closely to the particular object to be welded and consist of parts in an integral structure, viz., a receptacle portion 4 and a rail engaging portion 5 which includes an excess metal or overflow basin 6 at each side of the weld, and two pockets 7 and 8 for packing sand.

The two halves preferably have extending flanges F for the convenient and efficient connection by means of the spring clamps C which are easily pushed over the flanges as shown in FIG. 2. The mold halves have holes H for the insertion therein of centering dowels (not shown). The mold halves rest at the bottom on a molded refractory plate 9 which is inserted between the concrete base B and the bottom of the rails. The plate 9 is a closure for the bottom of the weld gap and may be secured to the mold halves 3 by means of spring clamps C. This plate may have a recess 9' which coincides with the gap G to receive reinforcing metal.

The lower portion 5 of the mold may have any suitably attached box for holding sand. Whether a sand box and sand are used to surround the mold at the area of the weld will depend on the heat requirements, cooling rate, etc.

Figure 5:
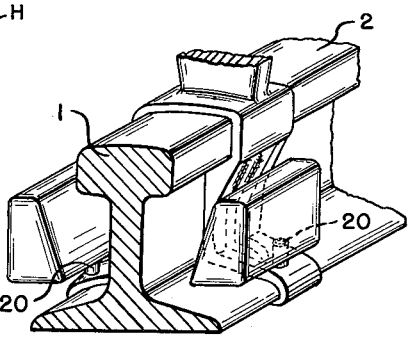
FIG. 5 shows the welded rails of FIGS. 1 to 4 after removal of the mold.

The receptacle 4 is large enough to hold a mixture of metal-producing material to provide the weld metal as shown in FIG. 5 and has a tapering bottom 13 which leads to a semi-circular depression 14 in which a steel closure 15, preferably three discs from $\frac{1}{16}$ to $\frac{3}{8}$ inch thick, is placed to keep the granular exothermic material from falling through the rectangular slots 16 which form a passageway into the gap G between the rails. This closure also delays the tapping to allow time for complete metal and slag separation.

The part 5 is shaped internally to provide space to receive the molded body of a special preheating exothermic moldable refractory material 17 (hereinafter described) which is rigid and non-fusible and shaped to conform to the shape of the rail and to provide space for the weld metal. A flat extension 18 of this preheating material covers the top of the rail, and one side of this molded material 17 is shaped to coincide with or overlie and enclose the overflow basin 6. In other words, the basin 6 is formed between members 3 and 17. The mold 3 and the preheating material 17 may also be formed together as an integral or composite structure. The molded exothermic members 17 have interior spaces 19 which overlie the gap G to provide the projecting weld metal or fillets shown in FIG. 5. When this exothermic material 17 is ignited it reacts without melting and preheats the rail ends. The mold 3 has a short piece of steel pipe 20 cast therein to provide a duct for the flow of excess metal into the overflow basin 6. Alternatively, this pipe may also be formed in the molded exothermic material 17. These pipes should be selected to provide holes which vary from about $\frac{1}{16}$ to $\frac{3}{8}$ inch in diameter depending on the size of the members to be welded.

The mold parts 3 and the botom plate 9 are preferably formed by the well known shell-mold practice of a mixture of sand and a thermosetting resin. This mixture is poured over a mold pattern which is heated to a temperature of about 500° F. The resin first softens and then sets or hardens to bind the particles of sand. This shell mold is then stripped from the pattern. Various thermosetting resins such as the phenol formaldehyde, preferably powdered and containing a cross-linking agent such as hexamethylene triamine, or urea formaldehyde resins may be used. The molded exothermic parts 17 may also be made by the shell-mold technique, preferably by applying to the mold pattern a mixture of the preheating exothermic material which also contains a thermosetting resin to form a hard rigid structure. This preheating material is preferably molded to conform to the approximate shape of the rail so that there will be contact with the rail and a good transfer of heat to the rail. After shaping the bodies of this preheating material, the sand resin mixture for the mold is applied thereover and both are heated to set the resin and form a composite or integral structure. The molded preheating material may be formed as a separate member as shown in FIG. 1 to be inserted into or against the refractory mold as shown in FIG. 3. The molded members 17 may also be made by baking or by the $CO_2$ hardening process used in forming cores. This preheating material contains refractory material to provide a non-fusible skeleton which maintains its shape to confine the space around the gap and hold the molten metal of the weld in place.

The following examples illustrate compositions for forming the exothermic moldable refractory material 17:

Example I

| | Percent |
|---|---|
| Aluminum #123 | 10 |
| Aluminum foil | 10 |
| Aluminum #122 | 10 |
| Red iron oxide | 20 |
| Manganese dioxide | 5 |
| Barium nitrate | 5 |
| Potassium fluoborate | 1 |
| Geauga core sand | 29 |
| Monsanto RC 736 resin | 10 |

Example II

| | Percent |
|---|---|
| Aluminum foil | 9½ |
| Aluminum grindings | 9½ |
| Aluminum #123 | 9½ |
| Red iron oxide | 25 |
| Calamo | 34 |
| Barium nitrate | 6¼ |
| Potassium fluoborate | 1 |
| Monsanto RC 736 resin | 5 |
| Citric acid | ¼ |

Example III

| | Percent |
|---|---|
| Aluminum #123 | 13.6 |
| Aluminum foil | 11.7 |
| Potassium fluoborate | 1.5 |
| Manganese oxide | 9.8 |
| Mill scale (−50 mesh) | 23.7 |
| Barium nitrate | 6.5 |
| Calamo 50 | 25.6 |
| Monsanto RC 736 | 7.6 |

Example IV

| | Percent |
|---|---|
| Aluminum #122 | 15.5 |
| Aluminum foil | 3.5 |
| Red oxide | 21.0 |
| Manganese oxide | 6.0 |
| Sodium nitrate | 3.5 |
| Barium nitrate | 2.0 |
| Potassium fluoborate | 2.0 |
| Aluminum #123 | 10.0 |
| Sand | 27.0 |
| Monsanto RC 736 resin | 9.5 |

The following example illustrates a composition of preheating material for use by the $CO_2$ hardening process of patent application Serial No. 198,739, filed May 31, 1962.

Example V

| | Percent |
|---|---|
| Calamo 35 | 36.9 |
| Aluminum foil (−40+100) | 19.8 |
| Aluminum, granular | 10.2 |
| Red iron oxide | 28.5 |
| Potassium fluoborate | 1.1 |
| Manganese dioxide | 2.4 |
| Sodium chlorate | 1.1 |

The following example illustrates another composition for preheating material which is the subject of copending patent application of John P. Walsh and Harold F. Bishop, Serial No. 204,633, filed June 22, 1962.

Example VI

| | Percent |
|---|---|
| Aluminum grindings | 3.2 |
| Aluminum foil (−10+100) | 20.0 |
| Aluminum dross | 18.2 |
| Perlite | 11.6 |
| Sodium nitrate | 9.4 |
| Goulac | 4.8 |
| Shell resin | 3.6 |
| Red iron oxide | 27.2 |
| Vinsol | 1.0 |
| Potassium fluoborate | 1.0 |

The metal-producing material E for forming the weld which is placed in the receptacle 4 may have any suitable thermite composition capable of producing the molten iron or steel for the weld, such as a pulverulent mixture of aluminum particles and iron oxide as the essential constituents together with varying amounts of slag forming material, and carbon or alloying metals when desired. For example, when welding steel rails which have a carbon content of 0.50% to 0.70% we prefer to use an alloy thermite having a lower carbon content but about 1½% nickel so that a rail having, say, 0.60% carbon will have a weld having 0.30% carbon and 1½% nickel. This will form a weld having a hardness matching that of the rail.

The following examples illustrate metal-producing exothermic material for forming the welds:

Example VII

| | Percent |
|---|---|
| Steel punchings | 11.7 |
| Ferromanganese (L.C.) | 1.5 |
| Calcium-silicon | 0.5 |
| Mill scale | 64.0 |
| Aluminum #122 | 18.9 |
| Nickel oxide | 1.5 |
| Fluospar | 1.9 |

Example VIII

| | Percent |
|---|---|
| Cast iron shot | 5.8 |
| Steel punchings | 5.9 |
| Ferromanganese (Std.) | 1.5 |
| Calcium-silicon | 0.5 |
| Ball-milled scale | 64.0 |
| Aluminum #122 | 18.9 |
| Nickel oxide | 1.5 |
| Fluospar | 1.9 |

Example IX

| | Percent |
|---|---|
| Cast iron shot | 5.8 |
| Steel punchings | 5.8 |
| Ferromanganese | 1.5 |
| Calcium-silicon | 0.5 |
| Mill scale | 64.6 |
| Aluminum #122 | 19.9 |
| Fluospar | 1.9 |

In carrying out a welding operation for the welding of steel rails the ends of the rails are cleaned to remove rust, scale, dirt, grease, etc. Optimum results are obtained by adjusting the gap G from ¼" to ⅝" depending upon the size of the rail.

In order to align the rails and maintain them in a stable position they are placed end-to-end over the rigid concrete girder or base B and rest on spaced thin strips S about ¾ inch thick.

After the molds 3 and their exothermic bodies 17 have been assembled around the rail with the clamps C applied and sealing sand packed into the pockets 7 and 8, the flame of a torch is directed through the opening 16 to ignite the preheating material 17. After about 15 minutes the rail ends will be preheated to a temperature of from 600° F. to 1600° F. The purpose of this preheating treatment is to prevent cracking in the weld, and the degree of preheating required for this purpose is based upon the metallurgical composition, size, and configuration of the rail or other object to be welded. The degree of preheating produced is controlled by varying the weight of the preheating material 17.

After the prescribed waiting time, usually about 15 minutes, the metal discs 15 are inserted into the receptacle 14. The metal-producing exothermic material E is poured into the receptacle 4. Then ignition powder, consisting, for example, of a mixture of barium peroxide, 195 grams, and aluminum powder, 20 grams, is placed on the top of the metal-producing material E and a fuse, such as a perchlorate or dynamite type fuse, is placed in the center of the ignition powder for the ignition of this powder. Then the fuse is ignited to ignite the ignition powder and start the exothermic reaction in the metal-producing material. This material reacts to form steel at a temperature of about 4600° F. When this material liberates an appreciable mass of molten steel the heat melts the discs 15 and the metal flows through opening 16 into the gap G between the rails. Since there is an appreciable excess of metal formed by the reaction, a considerable amount of it flows through pipes 20 into the basins 6. After the reactions have subsided the mold is left in position for about one-half hour and is then removed. This insures that the weld area will be maintained at a temperature over 1000° F. for this period of time, which will serve to relieve residual stresses resulting from the high thermal gradients produced by the welding operation. This stress relieving treatment prevents the formation of hard spots and improves the mechanical properties of the weld metal. The resulting weld from the exothermic reaction may appear as in FIG. 5. The gate metal at the top and the underflow metal at the sides are broken off and the remaining excess metal on the head of the rail is ground off.

Figure 6:
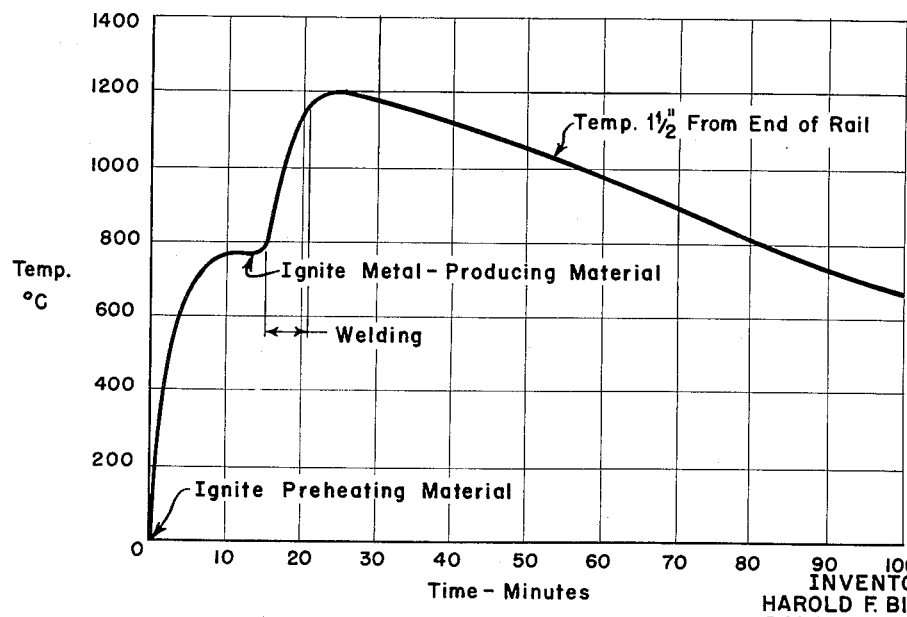
FIG. 6 is a curve showing the heating and cooling cycle in welding a ninety-pound steel rail.

The heating curve illustrated in FIG. 6 shows the rate and amount of preheating, the temperature increase resulting from igniting the metal-producing material and the rate and amount of cooling. The temperatures are those taken of the rail about 1¼" from the gap between the rails. The slow cooling made possible by the reservoir of heat effectively anneals the weld and removes the stress.

This application is a continuation-in-part of our application Serial No. 99,222, filed March 29, 1961.

We claim:

1. The process of welding together two steel members held in spaced position at the place to be welded which comprises securing on each member adjacent the place to be welded a rigid mass of preheating exothermic material, igniting the rigid mass of preheating exothermic material which reacts without fusion and preheats the members, providing in a receptacle above the weld a mass of steel-producing exothermic material, a few minutes after igniting the preheating exothermic material igniting the steel-producing exothermic material in the receptacle and accumulating the resulting molten steel in the receptacle and after the accumulated steel has separated from the slag flowing the accumulated steel into the space between the members to form the weld, said molten steel being in appreciable excess of the amount required to form the weld, flowing the excess steel into an overflow basin located at a side of the weld, and annealing the weld by means of the residual heat resulting from the reactions.

2. In the process of claim 1 confining the exothermic materials in a refractory mold surrounding the weld and providing an overflow basin for excess steel at each side of the weld between the preheating exothermic material and the refractory mold.

3. A rigid refractory device for welding steel objects in the form of rods, rails, bars, and the like, which objects are supported on a rigid base in spaced relation so as to form a gap for the weld metal between the ends of the objects, said device being formed of at least two refractory mold parts which, when secured together, surround the objects at the area of the weld, said device consisting of a receptacle above the gap for holding a charge of metal-producing exothermic material, a rigid body of non-fusible preheating exothermic material on the inside of the refractory mold parts in contact with the objects adjacent the gap, said rigid preheating exothermic material providing the heat for preheating, the refractory mold part and the rigid body of preheating exothermic material being spaced forming an overflow basin to receive excess metal, a passageway from the receptacle to the gap for the flow of metal of the metal producing exothermic reaction into the gap, another passageway from the gap to the basin for the flow of excess metal from the gap into the basin, and a refractory member for closing the bottom of the gap which is held against the underside of the objects.

4. A device according to claim 3 which comprises a duct in the refractory mold for the flow of metal from the gap into the overflow basin.

5. A device according to claim 3 which comprises a duct in the rigid preheating exothermic material for flowing excess metal from the gap into the overflow basin.

6. A device according to claim 3 which comprises a flat refractory plate attached to the refractory mold parts and held against the under side of the members to close the gap, said plate having a recess under the gap for receiving molten steel which becomes integral with the weld.

7. A device according to claim 3 which comprises an overflow basin on each side of the weld.

References Cited in the file of this patent

UNITED STATES PATENTS

| | | |
|---|---|---|
| 1,671,730 | Lange | May 29, 1928 |
| 2,887,743 | Burke | May 26, 1959 |

FOREIGN PATENTS

| | | |
|---|---|---|
| 389,918 | Germany | Feb. 9, 1924 |
| 856,233 | Great Britain | Dec. 14, 1960 |